US010081733B2

(12) United States Patent
Haymov et al.

(10) Patent No.: US 10,081,733 B2
(45) Date of Patent: Sep. 25, 2018

(54) PROCESS OF FORMING TRANSPARENT CONDUCTIVE COATINGS WITH SINTERING ADDITIVES

(71) Applicant: Clearview Films Ltd., Industrial Park Caesarea (IL)

(72) Inventors: Ilana Haymov, Netanya (IL); Nikolay Yaframenko, Rishon Letzion (IL); Dov Zamir, Beerotaim (IL); Arkady Garbar, Lakeville, MN (US); Dmitry Lekhtman, Afula (IL)

(73) Assignee: Clearview Films Ltd., Industrial Park Caesarea (IL)

( * ) Notice: Subject to any disclaimer, the term of this patent is extended or adjusted under 35 U.S.C. 154(b) by 26 days.

(21) Appl. No.: 14/984,330

(22) Filed: Dec. 30, 2015

(65) Prior Publication Data

US 2016/0115327 A1    Apr. 28, 2016

Related U.S. Application Data

(62) Division of application No. 13/583,563, filed as application No. PCT/IB2011/000765 on Mar. 9, 2011, now Pat. No. 9,257,211.

(60) Provisional application No. 61/311,992, filed on Mar. 9, 2010.

(51) Int. Cl.

| H01B 1/02 | (2006.01) |
|---|---|
| B05D 5/12 | (2006.01) |
| C09D 5/24 | (2006.01) |
| H01B 1/22 | (2006.01) |
| B22F 7/04 | (2006.01) |
| C23C 24/08 | (2006.01) |
| C23C 26/00 | (2006.01) |
| B05D 7/02 | (2006.01) |

(52) U.S. Cl.
CPC .............. C09D 5/24 (2013.01); B05D 5/12 (2013.01); B05D 7/02 (2013.01); B22F 7/04 (2013.01); C23C 24/08 (2013.01); C23C 26/00 (2013.01); H01B 1/02 (2013.01); H01B 1/22 (2013.01)

(58) Field of Classification Search
CPC ... H01B 1/00; H01B 1/08; H01B 1/22; H01B 1/24; B05D 5/12; C09D 5/24
See application file for complete search history.

(56) References Cited

U.S. PATENT DOCUMENTS

| 5,476,535 | A | 12/1995 | Khasin |
| 7,544,229 | B2 | 6/2009 | Garbar et al. |
| 7,566,360 | B2 | 7/2009 | Garbar et al. |
| 7,601,406 | B2 | 10/2009 | Garbar et al. |
| 9,257,211 | B2* | 2/2016 | Haymov ............... B22F 7/04 |
| 2003/0180511 | A1 | 9/2003 | Yukinobu et al. |
| 2005/0215689 | A1 | 9/2005 | Garbar et al. |
| 2010/0200407 | A1* | 8/2010 | Garbar .............. H05K 3/246 |
| | | | 205/50 |
| 2012/0168684 | A1 | 7/2012 | Magdassi et al. |
| 2014/0306263 | A1* | 10/2014 | Garbar ............. H01L 31/1884 |
| | | | 257/99 |
| 2015/0047883 | A1 | 2/2015 | Shapira et al. |

FOREIGN PATENT DOCUMENTS

| CN | 1446653 | 10/2003 |
| JP | 3501942 | 3/2004 |
| WO | WO2006/135735 | 12/2006 |
| WO | WO2009/149249 | 12/2009 |

OTHER PUBLICATIONS

International Search Report of international application No. PCT/IB2011/000765, dated Nov. 2, 2011, 14 pp.
International Preliminary Report on Patentability of international application No. PCT/IB2011/000765, dated Sep. 20, 2012, 6 pp.
Redmond et al., "Electrochemical Ostwald Ripening of Colloidal Ag Particles on Conductive Substrates," Nano Lett., vol. 5, No. 1, pp. 131-135, Jan. 2005.

* cited by examiner

*Primary Examiner* — Mark Kopec
(74) *Attorney, Agent, or Firm* — Bradley Arant Boult Cummings LLP

(57) ABSTRACT

A process is disclosed for the delayed sintering of metal nanoparticles in a self-assembled transparent conductive coating by incorporating a sintering additive into the water phase of the emulsion used to form the coating. The sintering additive reduces the standard reduction potential of the metal ion of the metal forming the nanoparticles by an amount greater than 0.1V but less than the full reduction potential of the metal ion. Emulsion compositions used in the process are also disclosed.

19 Claims, No Drawings

PROCESS OF FORMING TRANSPARENT CONDUCTIVE COATINGS WITH SINTERING ADDITIVES

CROSS-REFERENCE TO RELATED APPLICATIONS

This application is a divisional of U.S. application Ser. No. 13/583,563 filed Oct. 22, 2012, which is a National Stage application under 35 U.S.C. § 371 of International Application No. PCT/IB2011/000765, having an International Filing Date of Mar. 9, 2011, which claims priority to U.S. Provisional Application Ser. No. 61/311,992, filed on Mar. 9, 2010. The disclosures of the prior applications are considered part of (and are incorporated by reference in) the disclosure of this application.

TECHNICAL FIELD

This invention relates to a process of forming transparent conductive coatings comprising a pattern of conductive traces formed of at least partially joined nanoparticles defining randomly-shaped cells transparent to light. More particularly, it relates to a process of forming transparent conductive coatings by the self-assembly of nanoparticles from a coated emulsion into conductive traces that define randomly-shaped cells that are transparent to light. Coating compositions for forming the transparent conductive coatings are also described.

BACKGROUND

Transparent conductive coatings are useful in a variety of electronics devices. These coatings provide a number of functions such as electromagnetic (EMI shielding) and electrostatic dissipation, and they serve as light transmitting conductive layers and electrodes in a wide variety of applications. Such applications include, but are not limited to, touch screen displays, wireless electronic boards, photovoltaic devices, conductive textiles and fibers, organic light emitting diodes (OLEDs), electroluminescent devices, and electrophoretic displays, such as e-paper.

Transparent conductive coatings such as those described in U.S. Pat. Nos. 7,566,360 and 7,601,406 and WO2006/135735 are formed from the self-assembly of conductive nanoparticles coated from an emulsion onto a substrate and dried. Following the coating step, the nanoparticles self-assemble into a network-like conductive pattern of randomly-shaped cells that are transparent to light.

In order to achieve low sheet resistances on the order of 100 ohm/sq or less, the coatings typically require sintering after pattern formation. Such sintering can be done by thermal treatment alone, but the temperatures required are generally too high for most flexible, polymeric substrates that are desirably used in commercial scale roll-to-roll processing. Sintering can also be done chemically by a separate processing step such as exposing the formed pattern to certain chemical washes or vapors. Examples include exposure to an acid or formaldehyde solution or vapor, as disclosed in U.S. Pat. Nos. 7,566,360 and 7,601,406, or to acetone or other organic solvents as disclosed in PCT/US2009/046243. Such separate chemical processing steps are costly, inconvenient and potentially hazardous to workers in a commercial scale production process.

SUMMARY OF THE INVENTION

The process and coating compositions of the present invention eliminate the need for a separate chemical sintering step in the formation of low resistance transparent conductive coatings from nanoparticle-containing emulsions.

A process is disclosed for forming a transparent conductive coating on a substrate comprising: (1) forming an emulsion by mixing together (a) an oil phase comprising a solvent that is non-miscible with water having dispersed therein metal nanoparticles and (b) a water phase comprising water or a water-miscible solvent and an additive for delayed sintering of the nanoparticles that reduces the standard reduction potential of the metal ion of the metal forming the nanoparticles by an amount greater than 0.1V but less than the full reduction potential of the metal ion; (2) applying the emulsion to a substrate to form a wet coating; and (4) evaporating the liquid from the coating to form a dry coating comprising a network of electrically-conductive traces that define randomly-shaped cells that are transparent to light.

The sheet resistance of the coating is preferably less than 100 ohm/sq, and most preferably less than 10 ohm/sq without further chemical sintering.

In a preferred embodiment of the process, the additive for delayed sintering is an acid such as hydrochloric acid, sulfuric acid, phosphoric acid, acetic acid, or formic acid; a halide such as sodium chloride, ammonium chloride, or potassium chloride; a halogenated compound such as quaternary ammonium salts or ionic liquids.

In a preferred embodiment, the pH of the water phase before the addition of any other ingredients in addition to the water or the water miscible solvent and the delayed sintering additive is less than 3.0, and the pH of the water phase when mixed with the oil phase is greater than 8.0.

The invention also provides liquid coating compositions in the form of an emulsion for forming a transparent conductive coating on a substrate comprising (a) an oil phase comprising a solvent that is non-miscible with water having dispersed therein metal nanoparticles, and (b) a water phase comprising water or a water-miscible solvent and an additive for delayed sintering of the nanoparticles that reduces the standard reduction potential of the metal ion of the metal forming the nanoparticles by an amount greater than 0.1V but less than the full reduction potential of the metal ion. In the preferred coating composition, the additive for delayed sintering comprises an acid such as hydrochloric acid, sulfuric acid, phosphoric acid, acetic acid, or formic acid; a halide such as sodium chloride, ammonium chloride, or potassium chloride or a halogenated compound such as quaternary ammonium salts, or ionic liquids.

DETAILED DESCRIPTION OF PREFERRED EMBODIMENTS

The process and coating materials of the present invention are used to form a transparent conductive coating on the surface of a substrate comprising a pattern of conductive traces formed of collections of at least partially joined metal nanoparticles. Such traces define cells, generally free of the metal nanoparticles, which cells are generally transparent to light. Articles comprising such a transparent conductive layer are described in U.S. Pat. No. 7,601,406, the disclosure of which is incorporated herein by reference.

The term "nanoparticles" as used herein refers to fine particles small enough to be dispersed in a liquid to the extent they can be coated and form a uniform coating. This definition includes particles having an average particle size less than about three micrometers. For example, in some embodiments, the average particle size is less than one micrometer, and in some embodiments the particles measure less than 0.1 micrometer in at least one dimension.

The phrase "transparent to light" generally indicates light transparencies of between 30% and 95% in the visible wavelength range of about 400 nm to 700 nm.

A liquid emulsion wherein the metal nanoparticles are contained in the continuous phase of the emulsion is used to form the transparent conductive layer. The continuous phase evaporates faster than the discontinuous phase, allowing growth of discontinuous phase cells to occur by emulsion droplet coalescence in a controlled fashion. Drying of the emulsion produces the pattern comprising distinct light-transmitting cells surrounded by traces that transmit significantly less light than the light-transmitting cells. The pattern produced by the cells and the peripheral traces has a network-like character that is observable by a light microscope.

The liquid emulsion in accordance with the present invention is a water-in-oil emulsion, where the continuous phase comprises an organic solvent having the nanoparticles dispersed therein, and the discontinuous phase comprises water or a water-miscible solvent and the additive for delayed sintering. Suitable solvents for use in formulating the emulsions are disclosed in U.S. Pat. No. 7,566,360, the disclosure of which is incorporated by herein by reference. Examples of preferred organic solvents for the oil phase include those that are characterized by an evaporation rate higher than the evaporation rate of water at ambient conditions. The solvents can be selected from the group of at least, but not limited to, petroleum ether, hexanes, heptanes, toluene, xylene, benzene, dichloroethane, trichloroethylene, chloroform, dichloromethane, nitromethane, dibromomethane, cyclopentanone, cyclohexanone, cyclohexane, cyclohexanol, UV and thermally curable monomers (e.g., acrylates), or any mixture thereof. The water phase is preferably based on water, but water-miscible solvents may also be used alone or in combination with water. Examples of water-miscible solvents include, but are not limited to, methanol, ethanol, ethylene glycol, glycerol, dimethylformamide, dimethylacetamide, acetonitrile, dimethylsulfoxide, N-methylpyrrolidone or any mixture thereof.

Other additives may also be present in the oil phase and/or the water phase of the emulsion formulations. For example, additives can include, but are not limited to, reactive or non-reactive diluents, oxygen scavengers, hard coat components, inhibitors, stabilizers, colorants, pigments, IR absorbers, surfactants, wetting agents, leveling agents, flow control agents, thixotropic or other rheology modifiers, slip agents, dispersion aids, defoamers, humectants, and corrosion inhibitors. Binder or adhesion components may also be present in the formulation, for example thermally-activated or UV-activated binders or adhesion promoters.

The metal nanoparticles may be comprised of conductive metals or mixture of metals including metal alloys selected from, but not limited to, the group of silver, gold, platinum, palladium, nickel, cobalt, copper or any combination thereof. Preferred metal nanoparticles include silver, silver-copper alloys, silver palladium or other silver alloys or metals or metals alloys produced by a process known as Metallurgic Chemical Process (MCP) described in U.S. Pat. Nos. 5,476,535 and 7,544,229. In the case of alloys, the "reduction potential" refers to the reduction potential of the metal ion corresponding to the predominant metal, in terms of weight percent, of the nanoparticles.

The metal nanoparticles mostly, though not necessarily exclusively, become part of the traces of the conductive network. In addition to the conductive particles mentioned above, the traces may also include other additional conductive materials such as metal oxides (for example ATO or ITO) or conductive polymers, or combinations thereof. These additional conductive materials may be supplied in various forms, for example, but not limited to particles, solution or gelled particles.

The basic emulsion formulations also include emulsifying agents or binders to stabilize the emulsion as described in U.S. Pat. No. 7,566,360. Examples of emulsifying agents include non-ionic and ionic surfactants such as the commercially available SPAN-20, span-80, glyceryl monooleate and dodecylsulfate. Examples of suitable binders include modified cellulose such as ethyl cellulose (MW 100,000-200,000), modified urea such as the commercially available BYK-410, Byk-411, and BYK-420 from BYK Chemie Ltd.

The basic emulsion formulations as described in U.S. Pat. No. 7,566,360 generally comprise between 40 and 80 percent of an organic solvent or mixture of organic solvents, from 0 to 3 percent of a binder, 0 to 4 percent of an emulsifying agent, 2 to 10 percent of metal powder and 15 to 55 percent of water or water miscible solvent.

The mixture may be prepared by dissolving the emulsifying agent and/or binder in the organic solvent or mixture of organic solvents and adding the metal powder. The metal powder is dispersed in the organic phase by ultrasonic treatment, high shear mixing, high speed mixing or any other method commonly used for the preparation of a suspension. After the water phase is added, a W/O emulsion is prepared by ultrasonic treatment, high shear mixing, high speed mixing or any other method commonly used for the preparation of an emulsion.

According to the present invention, the basic emulsion formulation is altered by the addition of a delayed sintering additive to the water phase of the emulsion. The term "delayed" as used herein means that a substantial amount of the sintering attributed to the presence of the additive occurs after the emulsion has been applied to the substrate.

The sintering-additive is a compound or mixture of compounds that reduces the standard reduction potential of the metal ion of the metal forming the nanoparticles by an amount greater than 0.1 V but less than the full reduction potential of the metal ion. While not wishing to be bound by a particular theory, it is believed that delayed sintering is due, at least in part, to the increased formation of metal ions (M+) at certain areas of the conductive network followed by the diffusion of these M+ ions to areas of the conductive network having is a lower concentration of the M+ ions where the ions are reduced back to the bulk metal state.

Nanoparticles of metals such as silver have different redox potentials than the bulk metal. This may allow sintering of a nanoparticle metal network by use of chemical agents.

The redox potential of metal nanoparticles varies with the size of the nanoparticle, the radius of curvature of a local part of the nanoparticle, the specific crystal facet of the particle that is exposed, etc. The size of the specific energy barrier between ionic and neutral atomic states (quantitatively associated with the standard potential) dictates the degree to which a metal in equilibrium is converted into associated metal ions. Upon oxidation, a metal ion (M+) may diffuse in an aqueous environment. If a large number of M+ ions are being generated locally on a part of a series of electrically-connected metal nanoparticles, they will diffuse to an area in which a smaller number are being generated. For instance, an area of very small radius metal nanoparticles will bias a natural local chemical reaction to make a relatively large concentration of M+ ions, whereas an area of large radius metal nanoparticles may make a low concentration of ions. As ions from the small radius area diffuse to an area of larger radius, the local potential at the larger radius area will disproportionately favor subsequent reduction of the ions back into the bulk metallic state. As long as the metal system can allow electrical transport to neutralize the incident M+ ion at the new surface, this net flux can continue indefinitely, with a slow overall consumption of metal from areas of small radius of curvature (sharp areas) and a metal growth of areas of low radius of curvature (flat areas). In general, this can lead to better electrical connection of weakly connected metal nanoparticles, as it fills in gaps between particles.

Changing the redox energies in the system can speed this process. Various chemistries can be chosen to increase the amount of ionic species in the system relative to the bulk metal. If the overall redox levels strongly favor metal being left in the non-ionized state, few ions are generated, and only slow sintering can occur. In contrast, if the overall redox levels completely bias formation of just ions, minimal re-precipitation of a bulk metal will occur, and the underlying metal will be consumed (for instance, to the point of effective complete exhaustion of the metal).

To promote sintering at commercially useful speeds, a sintering additive should be selected that increases the formation of metal ions at small radius areas and drives oxidation of the ions to the metal at larger radius areas. This will generally occur if the sintering additive reduces the standard reduction potential of the metal ion of the metal forming the nanoparticles by an amount greater than 0.1 V, but less than the full reduction potential of the metal ion. For example, in the case of silver, the sintering additive should reduce the standard reduction potential of the Ag+ ion by an amount greater than 0.1 V, but less than the full amount of a Ag+ ion which is 0.8V.

During the overall emulsion preparation-feeding-coating-pattern formation-sintering process, the process needs to be tuned to prevent unwanted reactions from occurring at inopportune times, e.g., too early in the process. For instance, it is undesirable for silver nanoparticles to start evolving into connected agglomerates in a coating on the interior of mixing equipment prior to coating on the intended surface. It is preferred for sintering to occur most aggressively after network formation. Sintering before that point is likely to grow nanoparticles to sizes that prevent patterns to form as intended.

Thus, additives should be selected that provide sintering after pattern formation on the substrate and reduce the risk of unwanted early sintering. If sintering actively occurs throughout the emulsion making, storage, delivery, and network formation stages, the metallic nanoparticles may grow to form agglomerates or macroparticles prior to network formation, and thus obstruct network formation as larger sized particles will diffuse and transport differently in an emulsion environment. Furthermore, additives that promote sintering may disrupt pattern formation by destabilizing the emulsions. A balance of various surface tensions, volatilities, viscosities is required for good pattern formation, and addition of chemically active ingredients may be deleterious to pattern formation. Finally, to ease production, additives should pose minimal risk of damage to production equipment or personnel owing to evolution of corrosive byproducts (for instance with high vapor pressure) during the process.

It has been found that the preferred sintering additives comprise a very small amount of acid or halide or other halogenated compound added to the water phase prior to mixing the water phase with the organic phase. With the addition of these materials, the sheet resistance of the coating formed from the resulting emulsion following thermal sintering of the coating, as measured by a Loresta MCP T610 4-point probe, is substantially less than that of coatings from emulsions prepared using a water phase that does not include the added acid, halide, or halogenated compound. The sheet resistance obtained when acid, halide, or halogenated compound is added to the water phase has been found in numerous trials to be approximately 2 orders of magnitude less than that obtained with coatings that do not include this component. Without the added component, coating sheet resistance after thermal sintering of about 150° C. for 2-3 minutes yields a sheet resistance on the order of 100-1000 ohm/sq. Previously, a subsequent chemical exposure step or a series of subsequent chemical exposure steps, for example exposure to an acid or formaldehyde solution or vapor, or to acetone or other organic solvents, was necessary to further lower the sheet resistance of such coatings to values on the order of 10 ohm/sq or less. In the present invention, sheet resistances on the order of 10 ohm/sq or less are routinely achieved with these types of emulsions without the need for subsequent chemical exposure steps.

The acid, halide, or halogenated compound may be added in any sequence to the water phase with respect to other components that are present in the water phase. Examples of suitable acids include hydrochloric acid, sulfuric acid, phosphoric acid, acetic acid, and formic acid. Examples of suitable halides include sodium chloride, ammonium chloride, and potassium chloride. Examples of suitable halogenated compounds include quaternary ammonium salts and ionic liquids. The concentration of acid, halide, or halogenated compound added to the water phase is preferably in the range of 0.001M to 0.1M relative to the water phase.

In a preferred embodiment, the acid, halide, or halogenated compound is added to the water phase prior to the addition of other components to the water phase. In another preferred embodiment, the additive is an acid that is added to the water phase at a concentration of about 0.008M or such that the pH of the water phase is less than 3 prior to the addition of other components to the water phase. In another preferred embodiment, the acid is HCl.

The substrate on which the emulsions are coated may be flexible or rigid, and comprised of materials such as polymeric materials, glass, silicon or other semi-conductive material, ceramic, paper or textiles. The substrate is preferably a polymeric material such as a polyester, polyamide, polyimide, polycarbonate, polyolefin, polyacrylate, polymethyl methacrylate (PMMA), a copolymer, or mixtures thereof. The substrate may have a flat surface or a curved surface, and the surface may be smooth or rough.

The substrate may be used directly or pretreated, for example in order to clean the surface or otherwise alter it for improved adhesion, suitable surface tension or other characteristics. Pretreatment may be effected by physical means or chemical means. Physical means include, but are not limited to, corona, plasma, UV-exposure, heat, infrared, or other irradiation, or flame treatment. Chemical pretreatment may be performed, for example, with an acid, a primer, or other preliminary coating, such as a hard-coat coating. For example, the substrate may have a hard-coat layer applied in order to provide mechanical resistance to scratching and damage. A more detailed disclosure of methods of pretreating the substrate can be found in PCT.US2009/046243.

Pretreatment steps can be performed off-line or on-line immediately prior to subsequent coating, printing, and deposition steps. Such physical treatment of the substrate can be performed by batch process equipment or continuous coating equipment, on small laboratory scales or on larger industrial scales, including roll-to-roll processes.

The emulsion may be deposited on the substrate by coating, spraying, or other deposition methods. Coating can be performed by batch coating equipment or continuous coating equipment, on small laboratory scale or on larger industrial scales, including roll-to-roll processes. The coating apparatus may be any of a variety of contact or non-contact coaters known in the art, such as comma coaters, die coaters, gravure coaters, reverse roll coaters, knife coaters, rod coaters, extrusion coaters, curtain coaters, or any other coating device or metering device. Coating may involve single pass or multiple pass processes. According to one embodiment of the present invention, the step of coating an emulsion on a surface provides a wet emulsion thickness of 1 to 200 microns.

After applying the emulsion the substrate; the solvent is evaporated, with or without the application of heat. When the liquid is removed from the emulsion, the nanoparticles self-assemble into a network-like pattern of conductive traces defining randomly-shaped cells that are transparent to light. A heat treatment on the order of two minutes at about 150° C. is frequently used to increase the adhesion of the pattern to the substrate.

The improved process and compositions may be suitable for, but is not limited to, applications such as EMI shielding, electrostatic dissipation, transparent electrodes, touch screens, wireless electronic boards, photovoltaic devices, conductive textiles and fibers, display screens, organic light emitting diodes, electroluminescent devices, and e-paper.

Example 1

As a comparative example, an emulsion with the following formulation was prepared without addition of an acid, halide, or halogenated compound in the aqueous phase:
Organic Phase:

| Component | Supplier | Weight (g) |
|---|---|---|
| Cymel 1168 | Cytec Industries | 0.06 |
| K Flex 148 | King Industries | 0.06 |
| Byk 410 | BYK-Chemie | 0.08 |
| Disperbyk 106 | BYK-Chemie | 0.03 |
| Sorbitan monostearate Span 60 | Sigma-Aldrich | 0.08 |
| Aniline | Sigma-Aldrich | 0.14 |
| Nacure 2501 | King Industries | 0.10 |
| Cyclohexanone | Gadot Chem Term. | 1.70 |
| Toluene | Gadot Chem Term. | 29.5 |
| Ag nanopowder PT204 | Cima Nanotech | 2.66 |

Aqueous Phase:

| Component | Supplier | Weight (g) |
|---|---|---|
| Water | — | 18.7 |
| sodium dodecyl sulfate (SDS) | Sigma-Aldrich | 0.005 |
| 2-aminobutanol | Fluka | 0.044 |

This formulation corresponds to a total metal loading of 5% by weight. Following coating of the emulsion on a PET substrate (SH34, SKC Corp.) at a wet coating thickness of 40 microns, drying in air, and thermal treatment for at 150° C. for 2 minutes, the resistance of the resulting coating was 270 ohm/sq, as determined with a Loresta GP resistance meter equipped with an ESP-type 4-point probe. When such films are then further treated by immersing in a 1 M HCl solution for a duration of 30-60 seconds followed by rinsing in water for about 30 seconds, sheet resistance is reduced to values in the range of 2-10 ohm/sq.

Example 2

An emulsion with the same organic phase as in Example 1 was prepared. The aqueous phase was altered relative to Example 1, such that hydrochloric acid (HCl) was added to the water at a concentration of 0.008 M:
Aqueous Phase:

| Ingredients | Weight (g) |
|---|---|
| 0.008M HCl in water | 18.7 |
| SDS | 0.005 |
| 2-aminobutanol | 0.044 |

The pH of the water with added acid was 2.25. Following subsequent mixing with SDS and 2-aminobutanol, the pH of the aqueous phase was 10.0. The aqueous phase was then mixed with the organic phase to form an emulsion. Following coating of the emulsion on an optical grade PET substrate (Skyrol SH34, SKC Corp., Korea) at a wet coating thickness of 40 microns, drying in air, and thermal treatment at 150° C. for 2 minutes, the resistance of the resulting coating was 3.5-4 Ω/sq, as determined with a Loresta GP resistance meter as in Example 1. Transparency was 70.5% as determined with a Cary 300 UV-Vis spectrophotometer in the range of 370-770 nm. A primer layer was not needed on the substrate and good adhesion to the substrate was achieved.

Example 3

In an industrial pilot run using roll-to-roll coating equipment, the formulation of Example 2 above yielded films with an average sheet resistance of 3.6 and 3.5 Ω/sq in the machine direction (MD) and the transverse direction (TD), respectively. The process involved feeding the emulsion formulation through a coating die at a rate of 62 ml/min onto as received SH34 PET substrate moving at a rate of 6 m/min. Following exposure to a subsequent 5 meter zone in which the organic solvent in the coated film was allowed to evaporate, the coated film was then automatically fed to an on-line continuous oven with two consecutive heated zones of 4.5 meters each. The temperature of the first heated zone was controlled to 130° C. and the second zone to 140° C. As part of the same online process, the resulting film was then automatically wound into a roll.

Subsequent testing of the film showed that light transmission was 68%. Average cell diameter of the random cells in the coated pattern was 143 microns and average line width was 15.8 microns, as determined with the aid of Image-Pro Plus 4.1 imaging software. Adhesion of the coating to the substrate was checked by rubbing the film with an index finger, and adhesion was found to be good. The process did not require a preliminary primer coating on the substrate or other pre-coating treatment of the substrate, nor did it require post-coating chemical wash treatment steps to yield the exceedingly low sheet resistance that was obtained. Therefore, the process for applying the coating is a highly effective one-pass one-coat process.

Using the same equipment and the same emulsion formulation, another sample of as received SKC SH34 PET substrate was coated. In this run, the emulsion was fed to the coating die at a rate of 80 ml/min and the equipment line speed was 10 m/min. Following exposure to the same evaporation zone and oven zones as mentioned above, and after on-line rolling into a completed roll, the resulting film had average sheet resistance values of 5.9 Ω/sq and 5.5 Ω/sq in MD and TD, respectively. Average cell diameter for the resulting coated pattern was 107 microns and average line width of the cells was 13.4 microns.

Example 4

An emulsion was prepared as in Example 2, except that the acid was $H_2SO_4$ instead of HCl and the amount of acid added was such that the pH of the solution of water plus acid was 2.25. Final pH of the aqueous phase was 9.2. Following coating, drying, and thermal treatment as in Examples 1 and 2 above, the resistance of the coated film was 33 ohm/sq.

Example 5

An emulsion was prepared as in Example 2, except that the acid was $H_3PO_4$ and the amount of acid added was such that the pH of the solution of water plus acid was 2.25. Final pH of the aqueous phase was 8.3. Following coating, drying, and thermal treatment as in Examples 1 and 2 above, the resistance of the coated film was 23 ohm/sq.

Example 6

An emulsion was prepared as in Example 2 with HCl in the water phase, except that the amount of acid added was such that the pH of the solution of water plus acid was 2.0. Final pH of the aqueous phase was 8.9. Following coating, drying, and thermal treatment as in Examples 1 and 2 above, the resistance of the coated film was 9-12 ohm/sq and transparency was 73%.

Example 7

An emulsion was prepared as in Example 2, except that NaCl halide salt at a level of 0.008 M was added to the water phase instead of HCl. Final pH of the aqueous phase was 10.0. Following coating, drying, and thermal treatment as in Examples 1 and 2 above, the resistance of the coated film was 25 ohm/sq and transparency was 69%. When an emulsion was prepared with a concentration of NaCl in water of 0.01M, resistance of the resulting film upon drying and thermal treatment as performed in Examples 1 and 2 was 3.5-4 ohm/sq and transparency was 67%.

Example 8

An emulsion was prepared as in Example 2, except that $NH_4Cl$ halide salt at a level of 0.008M was added to the water phase instead of HCl. Final pH of the aqueous phase was 9.6. Following coating, drying, and thermal treatment as in Examples 1 and 2 above, the resistance of the coated film was 2.5 ohm/sq and transparency was 70%.

Example 9

An emulsion was prepared as in Example 2, except that KCl halide salt at a level of 0.008M was added to the water phase instead of HCl. Final pH of the aqueous phase was 9.5. Following coating, drying, and thermal treatment as in Examples 1 and 2 above, the resistance of the coated film was 5 ohm/sq and transparency was 67%.

The invention claimed is:

1. A process for forming a transparent conductive coating on a substrate comprising:
   (1) forming an emulsion by mixing together (a) an oil phase comprising a solvent that is non-miscible with water having dispersed therein metal nanoparticles, and (b) a water phase comprising water or a water-miscible solvent and an additive for delayed sintering of the nanoparticles that reduces the standard reduction potential of the metal ion of the metal forming the nanoparticles by an amount greater than 0.1 V but less than the full reduction potential of the metal ion, wherein the additive is selected from the group consisting of a halide and a halogenated compound;
   (2) applying the emulsion to a substrate to form a wet coating; and
   (3) evaporating the liquid from the coating to cause the nanoparticles to self-assemble and form a dry coating comprising a network of electrically-conductive traces that define randomly-shaped cells that are transparent to light.

2. The process of claim 1 wherein the dry coating has a sheet resistance less than 100 ohm/sq.

3. The process of claim 2 wherein the dry coating has a sheet resistance less than 10 ohm/sq.

4. The process of claim 1, wherein the additive is present in the water phase at a concentration of 0.001M to 0.1M.

5. The process of claim 1, wherein the additive is a halogenated compound.

6. The process of claim 5, wherein the halogenated compound comprises a quaternary ammonium salt or an ionic liquid.

7. The process of claim 1, wherein the additive is a halide.

8. The process of claim 7 wherein the halide comprises sodium chloride, ammonium chloride or potassium chloride.

9. The process of claim 1 wherein the pH of the water phase is less than 3.0 after addition of the additive and greater than 8.0 when mixed with the oil phase.

10. A process for forming a transparent conductive coating on a substrate comprising:
    (1) forming an emulsion by mixing together (a) an oil phase comprising a solvent that is non-miscible with water having dispersed therein metal nanoparticles, and (b) a water phase comprising water or a water-miscible solvent and an additive for delayed sintering of the nanoparticles that reduces the standard reduction potential of the metal ion of the metal forming the nanoparticles by an amount greater than 0.1 V but less than the full reduction potential of the metal ion;
    (2) applying the emulsion to a substrate to form a wet coating; and
    (3) evaporating the liquid from the coating to form a dry coating comprising a network of electrically-conductive traces that define randomly-shaped cells that are transparent to light, wherein the additive is selected from the group consisting of hydrochloric acid, sulfuric acid, phosphoric acid a halide, and a halogenated compound.

11. The process of claim 10, wherein the dry coating has a sheet resistance less than 100 ohm/sq.

12. The process of claim 11, wherein the dry coating has a sheet resistance less than 10 ohm/sq.

13. The process of claim 10, wherein the additive is present in the water phase at a concentration of 0.001M to 0.1M.

14. The process of claim 10, wherein the additive is a halide.

15. The process of claim 14, wherein the halide comprises sodium chloride, ammonium chloride, or potassium chloride.

16. The process of claim 10, wherein the pH of the water phase is less than 3.0 after addition of the additive and greater than 8.0 when mixed with the oil phase.

17. A process for forming a transparent conductive coating on a substrate comprising:
   (1) forming an oil phase comprising a solvent that is non-miscible with water having dispersed therein metal nanoparticles;
   (2) forming a water phase comprising water or a water-miscible solvent and an additive for delayed sintering of the nanoparticles that reduces the standard reduction potential of the metal ion of the metal forming the nanoparticles by an amount greater than 0.1 V but less than the full reduction potential of the metal ion, wherein the additive is selected from the group consisting of an acid, a halide, and a halogenated compound;
   (3) forming an emulsion by mixing together the oil phase and the water phase;
   (4) applying the emulsion to a substrate to form a wet coating; and
   (5) evaporating the liquid from the coating to form a dry coating comprising a network of electrically-conductive traces that define randomly-shaped cells that are transparent to light.

18. The process of claim 17, wherein the additive is a halide or a halogenated compound.

19. The process of claim 17, wherein the additive is an acid selected from the group consisting of hydrochloric acid, sulfuric acid, and phosphoric acid.

* * * * *